(12) United States Patent
Burnett et al.

(10) Patent No.: US 11,996,878 B1
(45) Date of Patent: May 28, 2024

(54) CUSTOM AUDIO SIGNAL ENHANCEMENT ADAPTER

(71) Applicant: Government of the United States, as represented by the Secretary of the Air Force, Wright-Patterson AFB, OH (US)

(72) Inventors: Gregory Burnett, Dayton, OH (US); Griffin Romigh, Dayton, OH (US); Eric Thompson, Centerville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 689 days.

(21) Appl. No.: 17/151,915

(22) Filed: Jan. 19, 2021

Related U.S. Application Data

(60) Provisional application No. 62/986,354, filed on Mar. 6, 2020.

(51) Int. Cl.
  *H04B 1/40* (2015.01)
  *H01R 13/66* (2006.01)
  *H01R 31/06* (2006.01)
  *H04R 3/00* (2006.01)

(52) U.S. Cl.
  CPC .............. *H04B 1/40* (2013.01); *H01R 13/66* (2013.01); *H01R 31/065* (2013.01); *H04R 3/00* (2013.01)

(58) Field of Classification Search
  CPC ........ H04B 1/40; H01R 13/66; H01R 31/065; H04R 3/00
  See application file for complete search history.

(56) References Cited

U.S. PATENT DOCUMENTS

| | | | |
|---|---|---|---|
| 9,319,089 B1 | 4/2016 | Burnett et al. | |
| 2007/0004464 A1 | 1/2007 | Lair et al. | |
| 2010/0081337 A1 | 4/2010 | Dorogusker et al. | |
| 2013/0093240 A1 | 4/2013 | Lin et al. | |
| 2013/0238823 A1 | 9/2013 | Terlizzi et al. | |
| 2016/0224309 A1* | 8/2016 | Chou | G06F 3/165 |

OTHER PUBLICATIONS

Motorola Corporation, Motorola Two-Way Portable and Mobile Radio Accessory and Battery Catalog, 2006.

* cited by examiner

*Primary Examiner* — Andrew L Sniezek
(74) *Attorney, Agent, or Firm* — AFMCLO/JAZ; John T. Addicks

(57) ABSTRACT

Provided herein are novel methods for providing an enhanced audio signal adapter. The invention provides an in-line audio adapter that digitally enhances bi-directional radio communication for dismounted and mounted operators. The adapter may be customizable to the hearing ability of the radio user, and compatible with both standard military audio connectors and commercial audio connectors enhancing the operator's in-field capabilities to process, record, share, replay, and operate radio communications.

11 Claims, 2 Drawing Sheets

CUSTOM AUDIO SIGNAL ENHANCEMENT ADAPTER

Pursuant to 37 C.F.R. § 1.78(a)(4), this application claims the benefit of and priority to prior filed Provisional Application Ser. No. 62/986,354, filed 6 Mar. 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE DISCLOSURE

The invention provides an in-line audio adapter that digitally enhances bi-directional radio communication for dismounted and mounted operators. The adapter may be customizable to the hearing ability of the radio user, and compatible with both standard military audio connectors and commercial audio connectors enhancing the operator's in-field capabilities to process, record, share, play, replay, and operate radio communications.

BACKGROUND

The U.S. Department of Defense utilizes various UHF, VHF, AM/FM, and SATCOM radios. These radios may provide the primary means of communications and control for U.S. ground/air/sea mounted and dismounted units, all in coordination with critical elements of the command echelon and supporting battlefield assets. Military forces employ these radios to conduct a variety of missions ranging from Close Air Support, Fire Support, Intelligence, Surveillance, and Reconnaissance, to direct combat. These special operations are typically conducted in dynamic high noise environments. Unfortunately, it is common that Operators suffer from a variable degree of permanent and/or temporary hearing loss in one or more auditory frequency ranges effecting their hearing ability. To compensate for their individualized hearing impairment, Operators tend to increase the audio gain from the radio output seeking to improve their intelligibility of the communications. This overall gain amplifies levels for all frequencies regardless of whether the operator has diminished hearing abilities at those frequencies, potentially leading to the Operators unnecessarily over-exposing their ears to harmful audio levels. The invention disclosure within significantly reduces this problem faced by millions of radio operators both commercially and in the military.

Dismounted and mounted military operations using UHF, VHF, AM/FM, SATCOM and other combat net tactical radios to relay mission relevant information requiring customizable intelligibility of bi-directional communications. Civilian/Commercial operations using RF and other radios to relay responsive action information (e.g., law enforcement; 911-call centers; homeland security; fire-fighting; hostage-rescue; and other stressful, fast-paced team activities that could benefit from enhance) requiring customizable intelligibility of bi-directional communications.

Old methods/techniques do not adequately address these problems. Hearing aids provide frequency-selective filtering and gain level adjustments assisting the wearer's ability to hear audio sources. The disadvantage with this method is that it requires a physical device inserted into the wearer's ear and/or a battery powered processor worn behind the Pinna. The drawback of this approach is that it makes wearing a traditional, over-the-ear, headset uncomfortable and has the potential of breaking the acoustic seal required for effective hearing protection, thus exposing the wearer to harmful environmental noise. Another disadvantage of typical Hearing Aid technology is that it requires a specialized technician to adjust the DSP filters used to manipulate audio signals. Thus rendering this approach unable to be dynamically changed as the wearer migrates in and out of different soundscapes.

Noise Canceling Headsets: attempt to 'cancel' out the environment noise surrounding a headset to present a cleaner audio signal to the wearer. The disadvantage with this approach of signal processing is that it ties the wearer to a particular headset with the filtering capability embedded into the headset hardware. This hardware requires power and custom firmware tailored to a particular headset driver that cannot be 'upgraded'.

The advantages and features the Custom Audio Signal Enhancement Adapter enables may include:
1) Dynamic adjustment of processing based on wearer's hearing needs and/or ambient environment
2) Remote programming of customized filters through wireless transmission (NFC, BT, WiFi, etc.)
3) Digital signal processing of radio audio output in-line with radios and PTTs/Headsets.
4) Parasitic off of connected radio requiring no additional batteries.
5) Require NO changes to in-use field comm system configurations, purchasing of adapter cables, or training to utilize the invention.
6) Permits the use of commercial/civilian headsets with existing military radios enabling the operator to choose the most appropriate headset for their missions.

In an effort to address these concerns, the disclosed technique provides a fundamental phenomenon useful to the warfighter.

This invention builds upon the Air Force work patented in U.S. Pat. No. 9,319,089 issued Mar. 19, 2016, which is incorporated herein in its entirety.

SUMMARY OF THE INVENTION

The present disclosure relates to an audio signal enhancement adapter for interconnecting a radio communication equipment connector with non-Original Equipment Manufacturer (OEM) accessories and improving a digital audio file's audible characteristics, the apparatus comprising: a pass through portion including a first connector and a second connector having a same type and an opposing gender with respect to the first connector, wherein the first connector and the second connector have a plurality of contacts, and wherein the first connector and the second connector are interconnected so that electrical continuity is maintained between the plurality of contacts of the first connector and the plurality of corresponding contacts of the second connector. A conversion portion coupled adjacent the pass through portion may be configured to electrically interface with one of the plurality of the contacts of the first connector or the second connector, wherein the conversion portion is further configured to transmit a signal from one of the plurality of contacts of the first connector or the second connector to a non-OEM accessory. The apparatus is configured to concurrently maintain the functionality between an OEM accessory and a radio connected thereto. The conversion portion includes an audio capture module including a microcontroller electrically coupled to one of the plurality of contacts of the first connector or the second connector, and a memory electrically coupled to the microcontroller. The microcontroller is configured to receive an analog audio signal from the first connector or the second connector. The microcontroller is further configured to convert the analog audio signal to a digital audio file; wherein an audible filter software is contained on a flashable programmable memory to improve the digital audio file's audible characteristics.

While the invention may be described in connection with certain embodiments, it may be understood that the invention is not limited to these embodiments. To the contrary, this invention includes all alternatives, modifications, and equivalents as may be included within the spirit and scope of the present invention.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1A:
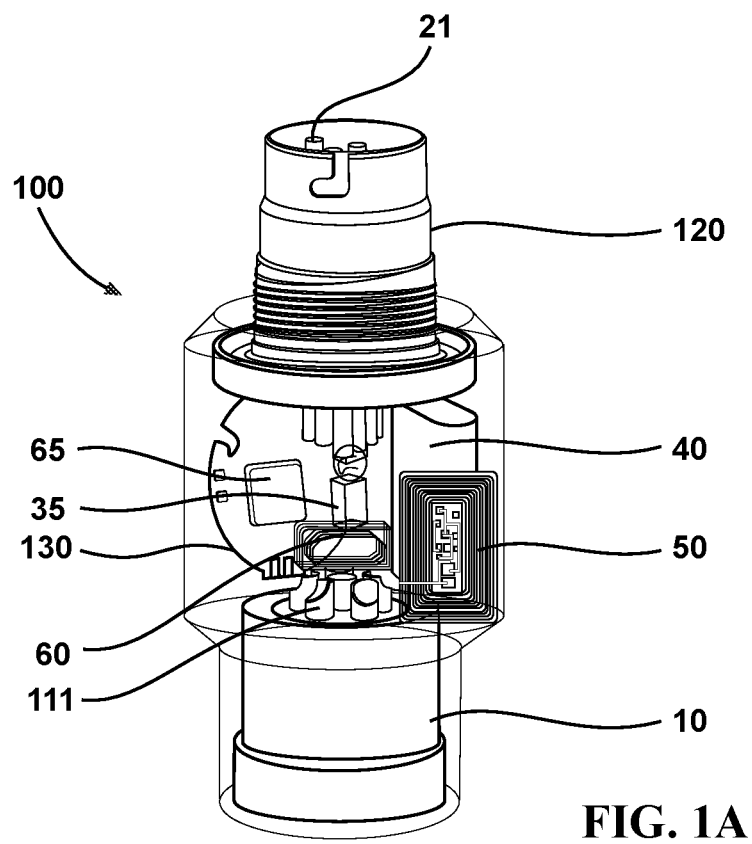
FIG. 1A is an illustration of one embodiment of the internal parts and internal arrangement of the present invention.
Figure 1B:
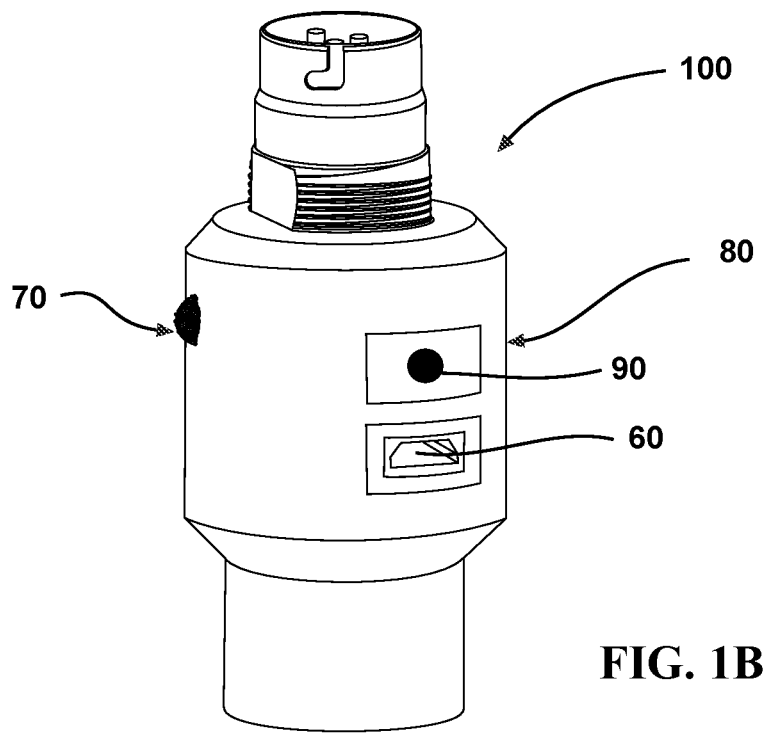
FIG. 1B is an illustration of one embodiment of the present invention.

As Shown in FIG. 1A and FIG. 1B, the present invention is an audio signal enhancement adapter 100 that may connect to UHF, VHF, AM/FM, SATCOM and other RF radios by an audio connector 10 having audio connector pins 111. A second connector 120 having second connector pins 21 is the opposite gender (male/female) to an Original Equipment Manufacturer (OEM) design and are electrical connected to pass analog and digital signals to their corresponding connector pins (not shown). Further shown in FIG. 1A is that internal to the adapter 100 is a microcontroller 130 that processes incoming audio signals from either audio connector 10 or the second connector 120 and conducts Digital Signal Processing (DSP) filtering to manipulate either an analog or a digital signal on one or more audio connector pins 111 or second connector pins 21 to control audio-left, audio-right, a microphone 70, data, and the like. The adapter 100 may include a flashable programmable memory 40 that stores an audio filter software that the microcontroller 130 loads into its local memory 35 perform signal processing on an audio file to improve the audible characteristics of the digital audio file. The adapter 100 may further include one or more antennas 50, which may be WiFi antennas, Bluetooth (BT) antennas, Near Field Communication (NFC) antennas and the like that allow for wireless communications between the adapter 100 and outside sources to load and transfer memory content to/from the adapter 100 including filters, stored audio data and the like.

Near Field Communication (NFC) is a set of communication protocols by which two electronic devices communicate when they are brought within 4 cm (1½ in) or less of each other.

The adaptor 100, as illustrated in FIG. 1A may further include a Global Positioning System (GPS) receiver 65 for receiving, identifying, recording, and communicating GPS data including the past GPS locations of attached devices, past GPS locations of the adaptor 100 and/or the current GPS location of adaptor 100.

As further shown in FIG. 1B, external to a shell 80 of the adapter 100 is a microphone 70 that is used to sample an ambient noise soundscape (not shown) and relays capture signals (not shown) to the microcontroller 130 (FIG. 1A) for additional processing. The adapter 100 may further include a multifunctional control button 90 that a user may use to turn the adapter 100 on or off; control the loading or transferring of filters (software) or audio data; switching to and from active filter processing; enabling or disabling an external microphone (not shown); and the like.

Additionally, as shown in FIG. 1B the adapter 100 may include an alternative axillary interface plug 60 such as a 3.5 mm plug, a NEXUS plug, a USB plug (illustrated), a 2.5 mm plug, a Micro-USB plug, a BNC (Bayonet Neill-Concelman) plug, a coaxial plug, or combinations thereof. The alternative axillary interface plug 60 may be used for a tether communication with the audio signal enhancement adapter 100. In one embodiment the adapter 100 may be connected to an audio connector of a radio. In one embodiment the adapter 100 may further include an alternative axillary interface plug such as a 3.5 mm plug, a NEXUS plug, a USB plug, a 2.5 mm plug, a Micro-USB plug, a BNC (Bayonet Neill-Concelman) plug, a coaxial plug, or combinations thereof. The connectors may be different types and act as a converter as well as a signal manipulator.

In one embodiment a digital analog conversion (DAC) circuit (a.k.a. conversion portion) may be used to exemplify the disclosed technique, it may be generally expanded to include an analog to digital conversion (ADC) and other analog/mixed-signal circuits that used on-chip calibration or mapping. This mixed-signal calibration and mapping may be used for independent data transmission. The conversion portion may further include a serial bus jack electrically coupled to the microcontroller, and wherein the microcontroller is configured to transfer a digital audio file from the memory to the serial bus jack. The conversion portion may further include a wireless transceiver electrically coupled to the microcontroller. The microcontroller may be configured to transfer a digital audio file from the memory to the wireless transceiver.

The audio signal enhancement adapter conversion portion may further includes a user interface electrically coupled to a microcontroller. The microcontroller is configured to play back a portion of a stored digital file to a speaker of a connected radio or a speaker of a connected accessory, in response to actuation of the user interface.

Figure 2:
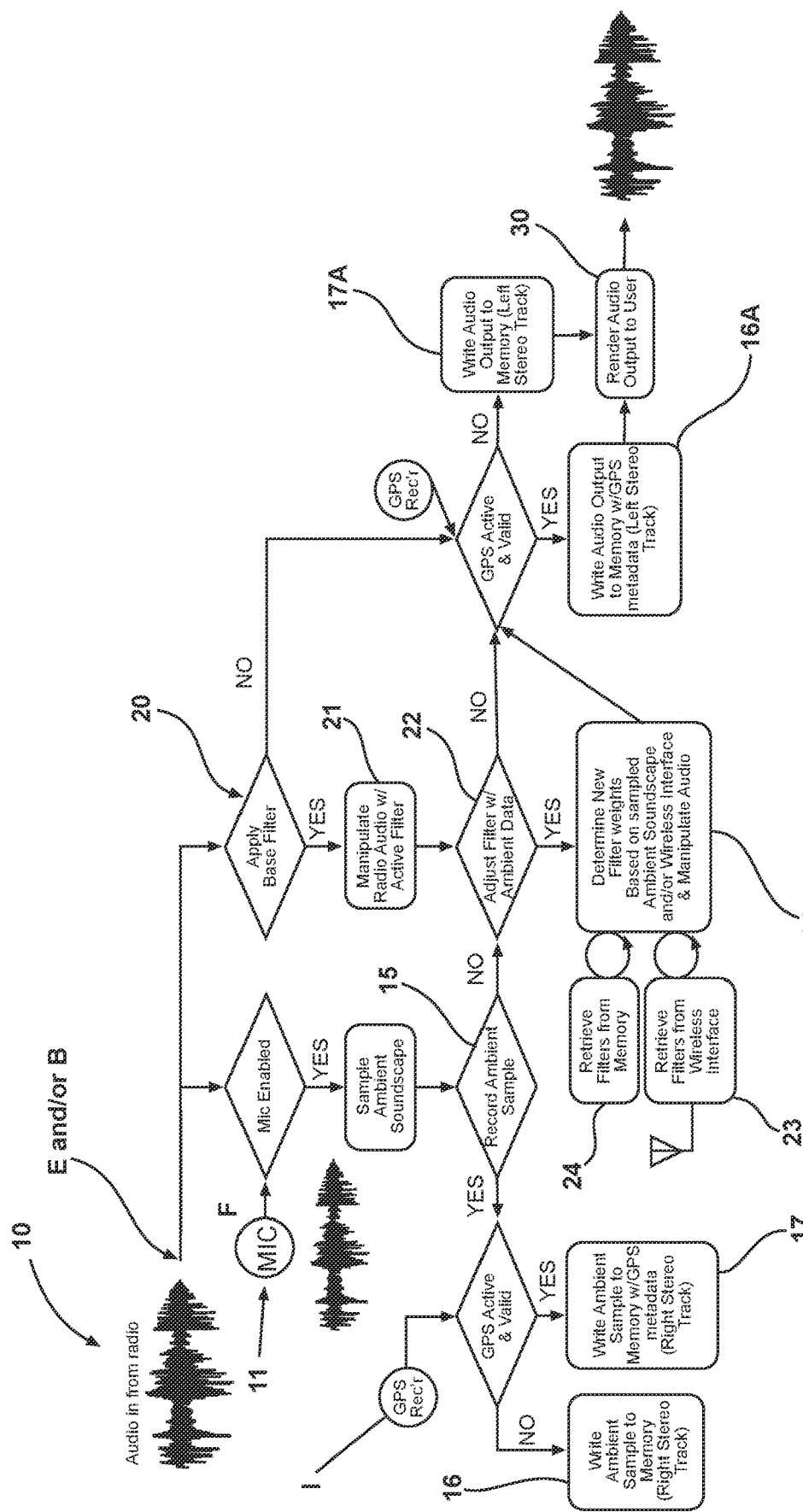
FIG. 2 is an illustration of one embodiment of the audio process used with the present invention.

FIG. 2 is an illustration of the audio process 200, used with the adapter 100. FIG. 2 illustrates Audio input 10 entering the adapter from either second audio connector B or audio connector E. The adapter 100 may apply a base filter 20 and may manipulate the audio 10 with an active filter 21 to determine new filter weights (settings) based on a sampled ambient soundscape and/or wireless interface to manipulate the audio input 10.

The GPS receiver 65 of FIG. 1A may be used as illustrated in FIG. 2 to write audio output to memory with GPS metadata on a stereo track 16A, or, without an active GPS with audio output to memory on a first/left stereo track 17A, either delivering an audio output 30 to a process user (not shown).

In parallel, as shown in FIG. 2 when the microphone F is enabled and the adapter 100 may sample the ambient soundscape and in one embodiment record the ambient soundscape 15. Using the active GPS provided by the GPS receiver I, the adapter 100 may write the ambient sample to memory with GPS metadata to a second/right stereo track 17. In one embodiment, without a GPS receiver I, the ambient sample track may be recorded to memory without GPS metadata on the second/right stereo track. In one embodiment the GPS may enable geo-location and time stamping of the stereo audio track.

Whether microphone 11, either second audio connector B or audio connector E, the audio may be adjusted with a filter using ambient data 22. New filter weights/settings may be established based upon samples ambient soundscape and/or the wireless interface to manipulate the audio input from the microphone 11, second audio connector B, audio connector E or combinations thereof. Adjusting the filters may be facilitated by retrieving filters from memory 24 and/or retrieving filters from a wireless interface 23.

While the present invention has been illustrated by a description of one or more embodiments thereof and while these embodiments have been described in considerable detail, they are not intended to restrict or in any way limit the scope of the appended claims to such detail. Additional advantages and modifications may readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An audio signal enhancement adapter for interconnecting a radio communication equipment connector with non-Original Equipment Manufacturer (OEM) accessories and improving a digital audio file's audible characteristics, the apparatus comprising:
a pass through portion including a first connector and a second connector having a same type and an opposing gender with respect to the first connector, wherein the first connector and the second connector have a plurality of contacts, and wherein the first connector and the second connector are interconnected so that electrical continuity is maintained between the plurality of contacts of the first connector and the plurality of corresponding contacts of the second connector;
a conversion portion coupled adjacent the pass through portion and configured to electrically interface with one of the plurality of the contacts of the first connector or the second connector, wherein the conversion portion is further configured to transmit a signal from one of the plurality of contacts of the first connector or the second connector to a non-OEM accessory;
a Global Positioning System receiver;
wherein the apparatus is configured to concurrently maintain the functionality between an OEM accessory and a radio connected thereto; and
wherein the conversion portion includes an audio capture module including a microcontroller electrically coupled to one of the plurality of contacts of the first connector or the second connector, and a memory electrically coupled to the microcontroller, wherein the microcontroller is configured to receive an analog audio signal from the first connector or the second connector, and wherein the microcontroller is further configured to convert the analog audio signal to a digital audio file; wherein an audible filter software is contained on a flashable programmable memory to improve the digital audio file's audible characteristics.

2. The audio signal enhancement adapter of claim 1, wherein the conversion portion further includes a serial bus jack electrically coupled to the microcontroller, and wherein the microcontroller is configured to transfer a digital audio file from the memory to the serial bus jack.

3. The audio signal enhancement adapter of claim 2, wherein the adapter includes an external microphone.

4. The audio signal enhancement adapter of claim 3, wherein the external microphone creates and records a stereo audio track.

5. The audio signal enhancement adapter of claim 4, wherein the Global Positioning System receiver enables geo-location and time stamping of the stereo audio track.

6. The audio signal enhancement adapter of claim 1, wherein the conversion portion further includes a wireless transceiver electrically coupled to the microcontroller, and wherein the microcontroller is configured to transfer a digital audio file from the memory to the wireless transceiver.

7. The audio signal enhancement adapter of claim 1, wherein the conversion portion further includes a user interface electrically coupled to the microcontroller, and wherein the microcontroller is configured to play back a portion of a stored digital file to a speaker of a connected radio or a speaker of a connected accessory, in response to actuation of the user interface.

8. The audio signal enhancement adapter of claim 1, wherein the adapter may be adjusted through a wireless control device.

9. The audio signal enhancement adapter of claim 1, wherein the adapter includes a near field communication radio.

10. The audio signal enhancement adapter of claim 1, wherein the Global Positioning System receiver is capable of generating Global Positioning System metadata, wherein the Global Positioning System metadata may be adjusted through a wireless control device.

11. The audio signal enhancement adapter of claim 1, wherein the Global Positioning System receiver capable of generating GPS metadata, wherein the GPS metadata may be adjusted through an axillary interface plug.

* * * * *